Figure 1:
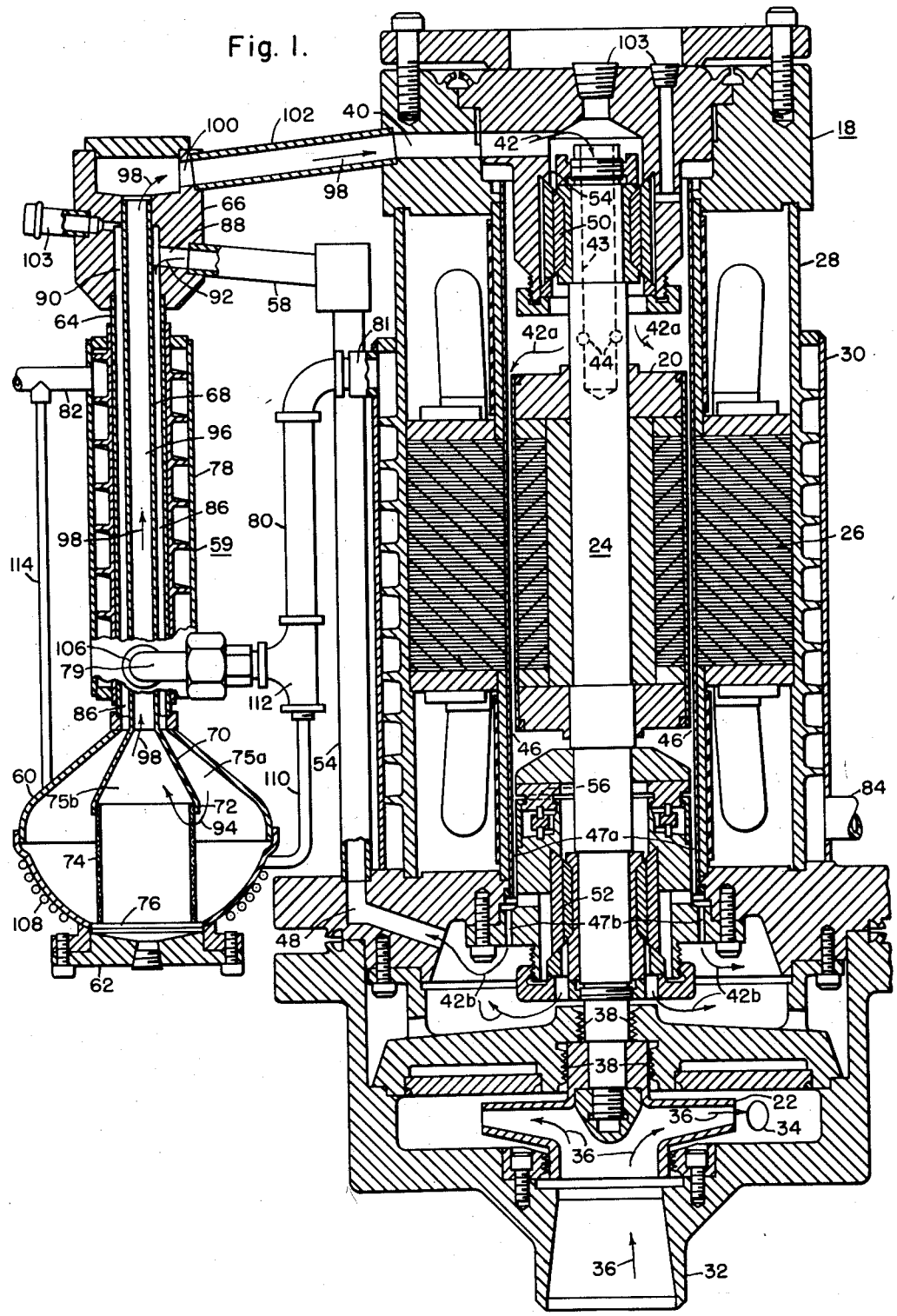

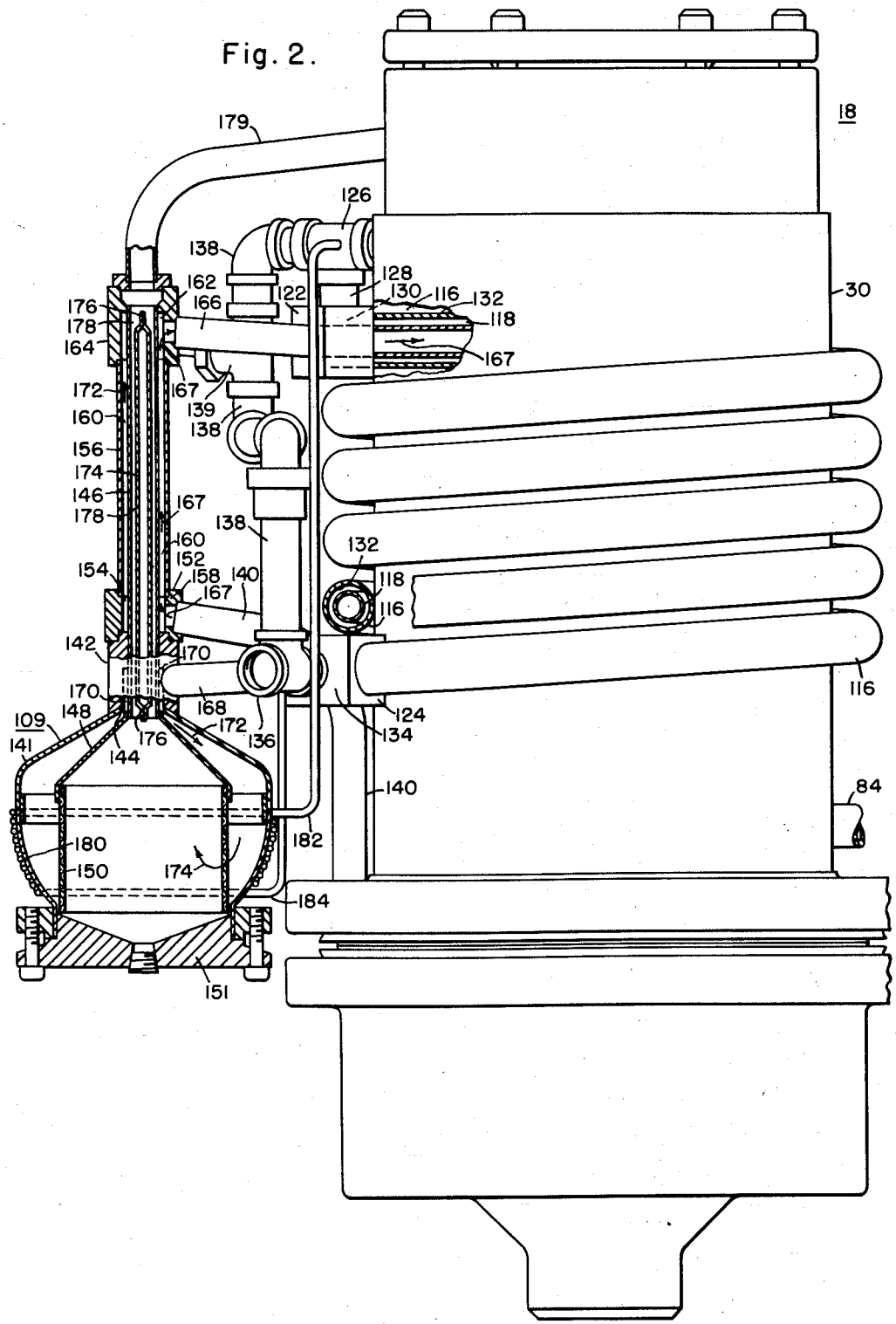

United States Patent Office 2,964,659
Patented Dec. 13, 1960

2,964,659

REGENERATIVE COLD TRAP AND ELECTRIC MOTOR COOLED THEREBY

Oliver P. Steele III, Franklin Township, Westmoreland County, Pa., and Harold F. Kongabel, Norfolk, Va., assignors to Westinghouse Electric Corporation, East Pittsburgh, Pa., a corporation of Pennsylvania Filed Jan. 30, 1957, Ser. No. 637,210

16 Claims. (Cl. 310—54)

The present invention relates to an improved cold trap for use in sealed systems and more particularly to a regenerative cold trap for use in the coolant system of a sealed electric motor-pump unit.

Sealed motor-pumps of the character described frequently are combined into a sealed unit wherein the stator and rotor of the motor section are each enclosed within respective fluid tight interior casings. Such units are utilized in various applications for pumping "liquid metals" and the like which frequently comprise the same material as that of the internal motor-pump coolant. "Liquid metals" as utilized herein designate those metals and alloys having melting points below 500° C. and frequently used in high temperature systems for their excellent heat transfer characteristics.

The internal coolant of the motor-pump may comprise sodium, sodium potassium alloy, bismuth, and the like, and is usually maintained at a lower temperature than the balance of the liquid metal system in order to remove electrical losses in the form of heat from the motor-pump unit. Motor-pumps of the character described are customarily provided with internal passageways arranged to conduct the coolant through the relatively small fluxile gaps in order to remove the electrical losses of the motor section and at the same time to lubricate the bearings of the motor-pump unit.

The liquid metal used within the motor-pump unit frequently has dissolved therein oxidation products or other impurities having a higher melting point than that of the liquid metal and which, therefore, tend to deposit in the coolest portions of the unit. Such impurities upon precipitation from the motor-pump coolant tend to clog the fluxible gap in the motor-pump unit, and additionally, because of the customarily abrasive nature thereof, frequently puncture the interior casings of the stator and rotor of the sealed motor-pump unit by abrading the surfaces thereof. The aforesaid abrasive action likewise causes undue wear in the bearings of the motor-pump, where these bearings as in many applications of the liquid metal pumps, are lubricated by the liquid metal circulating through the motor section of the motor-pump. This situation is aggravated in many applications of the aforesaid motor-pump units, wherein the interior casings thereof must be of extreme thinness in order to minimize electrical losses within the motor-pump unit. The aforementioned impurities likewise tend to accumulate in and clog the heat exchanger provided in the motor-pump coolant system for the removal of heat accumulated therein.

Additionally, it has been found desirable to remove the aforesaid impurities from many portions of a sealed liquid metal system particularly when these materials are present in the form of oxides, inasmuch as such oxides will react with structural components of the system to form an oxide coating on the surface thereof, in addition to causing abrading and clogging of the system. Cold traps, of the character described, have been utilized to remove undesirable material in sealed systems, when such material when cooled either precipitates out of the solution or congeals from a mixture of liquids in the system and to thereby remove solids from any part of the system where the unwanted deposition thereof may cause abrasion or clogging of the system.

Prior cold traps have frequently been constructed in the form of static and bypass types wherein only a portion of the main fluid stream of the system was circulated through the cold trap. In the use of prior cold traps, separate means usually had to be provided for after-heating the liquid issuing from the cold trap in order to ensure that the coolest spot within the system existed in the cold trap. Therefore, such cold traps were inherently inefficient and required considerable length of time in order to reduce the impurities in the system to the desired level. Prior cold traps, furthermore, not only frequently became clogged from uneven deposition of impurities therein but also were not provided with adequate means for the cleaning thereof.

Accordingly, an object of the invention is to furnish a cold trap of the character described with means associated therewith for conveniently after-heating the fluid passing through the cold trap.

Another object of the invention is to ensure that the coldest part of the system wherein the cold trap is utilized exists in an easily accessible portion of the cold trap.

A further object of the invention is to prevent the deposition of impurities, within the internal structure, from the coolant utilized in a sealed electric motor or other enclosed systems.

Still another object of the invention is to minimize, or prevent all together, the corrosition of structural materials utilized within sealed fluid systems.

Yet another object of the invention is to adequately purify the coolant utilized for cooling a sealed electric motor, or the like, and to thereby reduce abrasion and clogging of the flow passages within such device.

A still further object is to provide a cold trap wherein the cooler and reheater thereof are combined in a novel manner.

Another object of the invention is to improve the internal cooling and lubricating system of a sealed electric motor and the like.

The foregoing and other objects and features and advantages of the invention will be made more apparent during the ensuing description of exemplary forms of the invention, which description is to be taken in conjunction with the accompanying drawings, wherein similar reference characters identify similar parts and wherein:

Fig. 1 is a central, longitudinally sectional view of a regenerative cold trap constructed in accordance with the principles of this invention and shown here in association with a sealed motor-pump unit, and Fig. 2 is a side elevational view, partly in section, of another form of a regenerative cold trap associated with a sealed motor-pump unit and constructed according to the invention.

In accordance with the invention, a regenerative cold trap is provided wherein the cooler or heat exchanger and the after-heater therefor are conveniently provided in a unitary arrangement. Additional means are provided, in one example of the invention, for ensuring that the accessible portion of the cold trap is maintained at the coolest temperature within the cold trap and system wherein the trap is utilized. The regenerative principles of the trap are utilized in the manner that the outgoing fluid of the cold trap is utilized to partly cool the incoming fluid, while, in one arrangement, the incoming fluid is utilized to thermally insulate the outgoing fluid from the cooler portion of the cold trap and to raise the temperature of the outgoing fluid to an extent that will ensure that the balance of the enclosed fluid system will be maintained at a temperature above that existing in the coolest portion of the cold trap. With this arrangement, the concentration of undesirable impurities elsewhere within the sealed system will be maintained at that low level of concentration which can exist in the coolest portion of the cold trap, and therefore, such impurities can not precipitate or deposit in other parts of the system.

Referring now more particularly to Fig. 1 of the drawings, the exemplary form of the invention shown therein is adapted for use with a motor-pump unit 18 comprising a sealed rotor 20 and a pump impeller 22 mounted for movement together upon a rotary shaft 24. The shaft 24 is supported within an enclosed and sealed stator 26 suitably mounted within a motor housing 28, on which there is disposed a cooling jacket 30. The main fluid stream of the system in which the sealed motor-pump unit 18 is utilized enters through inlet 32 and exits through the outlet opening 34 of the pump. The main fluid stream indicated by the arrows 36 is prevented from entering the motor section of the motor-pump unit by a labyrinth seal indicated generally at 38. Thus, the main fluid stream, which may be at a much higher temperature than that of the internal coolant circulating through the motor section is prevented from freely mixing with the internal coolant. In furtherance of this purpose, the coolant circulating internally through the motor section is maintained at the same pressure as that existing in the main field stream by a very slight leakage past the labyrinth seals. This leakage, however, is insufficient to create any noticeable circulation between the main fluid stream and the motor coolant stream.

The internal motor coolant enters the motor-pump unit by way of the inlet port 40 and flows in the direction indicated by arrow 42 through the shaft 24, the upper portion of which is provided with a central, longitudinally extending channel 43 connecting the open upper end thereof with radial shaft openings 44, two of the latter being shown in this example. Upon emergence from the openings 44 out of which the internal coolant is pumped by centrifugal force created by rotation of the shaft 24, coolant then passes as indicated by arrows 42a through a gap 46 existing between the rotor 20 and the stator 26 and flows through passages 47a and 47b and thence out of the motor housing 28 via the outlet port 48, as indicated by the arrow 42b. A portion of the internal motor coolant is diverted between the bearing surfaces of the upper and lower bearings 50 and 52 via the passages 54 and 56, respectively. The coolant is circulated through the motor section by the centrifugal forces applied as the shaft 24 rotates, to the coolant contained within the shaft openings 44.

From the motor section of the motor-pump unit 18 the now heated internal coolant is conducted via the conduit 58 to a cold trap 59 comprising, in this example of the invention, a sealed vessel 60 having a removal bottom cover 62, and an upwardly extending, outer cylindrical casing 64 terminating in a suitable pipe fitting 66. Positioned within the outer cylindrical casing 64 and extending coaxially therewith is an inner tubular casing 68 terminating at the lower end thereof in a frustoconical extension or partition 70. The partition 70 is furnished with a lip 72 having such diameter as to engage the upper end of a cylindrical, loosely woven, wire mesh member 74, insertible through the opening 76 provided by removal of the bottom cover 62. The partition 70 thus serves to separate the space confined within the vessel 60 into discrete areas 75a and 75b communicating with one another through the wire mesh member 74 and coupled, respectively, to the outer casing 64 and the inner casing 68. The wire mesh member 74 serves to increase greatly the available surface upon which the impurities can precipitate within the vessel 60.

Upon the exterior surface of the casing 64, a cooling jacket 78 is disposed and is arranged along substantially the entire length thereof. The cooling jacket 78 is coupled, in this example of the invention, to the cooling jacket 30 provided on the exterior of the motor housing 28, through an inlet 79, a motor-pump external coolant conduit 80, and a motor-pump cooling jacket outlet 81. The coolant passing through the cold trap cooling jacket 78 from the cooling jacket 30 of the motor-pump unit is exited from the cold trap jacket 78 via the outlet 82. The external motor-pump coolant, which thus flows through both the motor jacket 30 and the cold trap jacket 78, enters the motor jacket 30 through the inlet 84.

The annular space 86, existing between the inner casing 68 and the outer casing 64, is connected to the motor-pump internal coolant outlet 48 through the conduit 58 and passages 88 and 90, respectively, provided within the pipe fitting 66. As indicated by the flow arrows 92 and 94, the internal motor-pump coolant flows downwardly in this application of the invention through the annular space 86 and into area 75a of the cold trap vessel 60 whereupon the coolant passes through the wire mesh member 74 and thence upwardly through area 75b and the frustoconical partition 70 and into central passage 96 of the inner casing 68. The coolant flows, in the direction indicated by arrows 98, through a passage 100 in the fitting 66 and a conduit 102 to the internal coolant inlet port 40 of the motor-pump unit. To facilitate draining and filling the internal coolant system, suitable air vents 103 are provided in the fitting 66 in communication with annular space 86 and in the motor housing 28.

From the foregoing it will be apparent that as the internal motor-pump coolant or other fluid to be subjected to temporary cooling in the cold trap 59, passes downwardly through the annular space 86, it is progressively cooled by the motor-pump or other cooling fluid passing upwardly through the cold trap cooling jacket 78. The incoming fluid to be cooled therefore, insulates that portion of the fluid issuing from the cold trap 59 via the central passage 96 from the cooling effect of the cooling jacket 78. Additionally, to ensure that the vessel 60 of the cold trap is the coolest part of the system, the temperature of the internal motor coolant flowing through the passage 96 is raised by that of the incoming fluid passing through the annular space 86. Thus, the cold trap cooling jacket 78 not only removes the heat accumulated within the incoming coolant fluid resulting from electrical losses of the motor, but also lowers the temperature of the coolant to an extent that precipitation of the undesirable impurities therein occurs within the cold trap vessel 60. Furthermore, it is ensured that the coolant within the vessel 60 is maintained at the coolest portion of the system by transferring a portion of the heat in the incoming fluid to the fluid passing out of the cold trap and thence conducted to the interior of the motor section.

In some applications of the invention, it has been found that unwanted deposition of impurities in the internal motor-pump coolant or other fluid entering the stream of the cold trap 59 takes place at a point or points adjacent the junction 106 of the cold trap cooling jacket inlet 79 with the cold trap cooling jacket 78 thereby tending to restrict the flow of fluid in the passage 86. Such unwanted deposition may occur, for example, in those applications of the invention wherein the flow of incoming coolant through the annular space 86 is comparatively slow and, therefore, sufficient turbulence is not developed within the incoming coolant to cause heat to be evenly transferred thereto from the cooling jacket. Accordingly, in one arrangement of the invention, the temperature existing in the fluid contained within the cold trap vessel 60 is lowered sufficiently to compensate for the reduced temperatures existing in the incoming fluid at that portion of the wall of the outer casing 64 adjacent the junction 106.

One such arrangement for so lowering the fluid temperature within the trap vessel 60 includes the provision of a cooling jacket or the like secured adjacent the lower portion of the cold trap vessel 60 and the wire mesh member 74. The last mentioned cooling jacket may take the form of one or more turns of tubing 108 tapped into the motor-pump external coolant conduit 80 by means of an inlet conduit 110 and a suitable fitting 112. The outlet of the tubing 108 is connected, for example, by way of a conduit 114 to the outlet 82 of the cold trap water jacket 78. The flow of motor-pump external coolant through the tubing 108 is restricted by the comparably small diameter thereof inasmuch as it is necessary only to lower the temperature of the fluid within the cold trap vessel 60 to the extent of a few degrees centigrade below that of the coldest portion of the fluid flowing within the annular space 86. Thus, only a small proportion of the total fluid passing through the motor-pump cooling jacket 30 is diverted through the tubing 108. The disposition of the tubing 108 adjacent the bottom of the vessel 60 and the wire mesh member 74 induces the preponderate portion of the impurities in the fluid to be deposited upon the member 74 for easy removal thereof and the associated impurities through the bottom of the vessel 60. Alternatively, the aforesaid impurities can be removed by draining the internal coolant from the system save that contained in the vessel 60. This latter portion of the coolant may then be heated to redissolve the impurities precipitated upon the wire mesh member 74 and the walls of the cold trap vessel 60, drained together with the impurities from the vessel, and discarded.

In Fig. 2 of the drawings, there is shown another form of regenerative cold trap and unitary motor-pump combination constructed in accordance with the instant invention. The regenerative cold trap 109 therein illustrated is basically similar to that described heretofore in connection with Fig. 1, but is provided additionally with means for increasing the turbulence in the fluid or liquid outgoing from the cold trap and consequently for increasing the heat transfer coefficient existing between the incoming and the outgoing fluids relative to the cold trap. Additionally, the cold trap and motor-pump combination of Fig. 2 is provided with means for increasing the cooling capacity of the cooling means utilized with the regenerative cold trap 109. The increased capacity of the cold trap cooling means is necessitated by use of the cold trap in conjunction with a motor-pump unit having a comparatively large capacity and therefore requiring increased cooling capacity in the internal coolant utilized therein, or with those units utilizing certain oils or other fluids in the external cooling jackets, which fluids are endowed with lower heat flow characteristics.

One arrangement for increasing the capacity of the cold trap cooler includes coaxial outer and inner tubes 116 and 118, respectively, wherein suitable well-known means (not shown) are provided for positioning the tube 118 within the tube 116.

The tubing 116 conveniently is wrapped upon and is supported by the motor-pump cooling jacket 30 and is secured at either end thereof to fittings 122 and 124. The cooling oil or other external coolant for the motor-pump unit 18 enters the inlet 84 of the external motor pump cooling jacket 30, flows through the cooling jacket 30 and passes out of the jacket 30 by way of a fitting 126 in a manner described heretofore in connection with Fig. 1. Part of the external motor coolant is diverted by means of suitable coupling 128 to an L-shaped passage 130 of the fitting 122 whence it flows into annular space 132 confined between the coaxial tubes 116 and 118 of the cold trap cooler. After flowing through the cold trap cooler, the external cooling oil is conducted through a similar L-shaped passage 134 in the fitting 124 to external coolant outlet 136 by way of outlet conduit 138. Suitable valve means 139 is associated desirably with the outlet conduit 138 for controlling the amount of external coolant to be diverted from the outlet fitting 126 into the annular space 132 of the cold trap cooler.

The internal motor coolant, after having been passed through the motor section of the motor pump unit in a manner described heretofore in connection with Fig. 1, flows by way of the conduit 140 to the regenerative cold trap 109. In this example of the invention, the regenerative cold trap comprises a vessel 141 having a collar 142 secured thereto in a position adjacent an opening 144 in the top of the vessel. Inserted through the collar 142 and supported thereby is an inner tubular casing member 146 joined at the lower end thereof to a frustoconical extension or partition 148. The frustoconical portion 148 engages a wire mesh member 150 insertable upon removal of a bottom closure 151, into the vessel 141, and divides the interior of the vessel 141 in the manner described heretofore in connection with the wire mesh member 74 and areas 75a and 75b of Fig. 1. To the upper end of the collar 142 is secured a fitting 152 to which the conduit 140 is coupled in communication with an annular space 154 provided within the fitting 152 by the insertion therein of the inner casing member 146. Surrounding the inner casing member 146 is an external tubular casing member 156 having the lower end thereof inserted into the fitting 152 whereupon it is supported by the shoulder 158 provided within the fitting 152 and communicates with the annular space 154. In conjunction with the casing member 146, the external casing member 156 forms an annular channel 160 which communicates with annular space 162 of a cold trap fitting 164. The annular space 162 is coupled, via a conduit 166 passing through the fitting 122, to the inner coaxial tubing 118 of the cold trap cooler.

The internal motor-pump coolant or other fluid entering the cold trap 109 and the associated cooler via the conduit 140, flows as indicated by arrows 167 into the fitting 152 and upwardly through the channel 160, with any flow into the cold trap vessel 141 being prevented by the collar 142 which is sealed to the exterior surface of the inner casing member 146. Thence, the fluid flows through the fitting 164, the conduit 166 and into the inner coaxial tube 118 of the cold trap cooler wrapped around the cooling jacket 30 of the motor-pump unit 18, as described heretofore. The motor-pump internal coolant or other fluid to be purified is conducted via the fitting 124 and a conduit 168, after having been cooled within the coaxial tubing 118 by the motor-pump external coolant or other fluid passing through the annular space 132 between the coaxial tubing 116 and 118, into the collar fitting 142. Thence, the motor-pump internal coolant flows by way of an annular space 170 formed in the collar fitting 142 into the cold trap vessel 141 and subsequently passes through the wire mesh 150, as indicated by the flow arrows 172 and 174, respectively, whereat the impurities precipitated or congealed from the cooled fluid collect upon the member 150 for their easy removal from the vessel 141, in a manner such as that described heretofore in connection with Fig. 1 of the drawings.

From the cold trap vessel 141, the outgoing fluid is channeled by the frustoconical partition 148 into the inner casing member 146 wherein the outgoing fluid absorbs a portion of the heat of the incoming fluid flowing within the annular channel 160, as indicated by the flow arrows 167. In order to effectively increase the heat transfer coefficient between the incoming and outgoing fluids flowing within the respective casing members 156 and 146, a tubular baffle 174 is supported within the inner casing member 146 and is preferably tapered adjacent ends 176 thereof in order to minimize frictional losses within the fluid stream. The baffle 174 thus serves to increase the rate of flow of the fluid through annular space 178 formed between the baffle 174 and the inner casing member 146. At the same time, the maximum amount of heat transfer surface as represented by the walls of the inner casing member 146, is provided between the incoming fluid within the channel 160 and the outgoing fluid within the annular space 178. Additionally, the increased speed of the fluid stream occasioned by use of the baffle 174 increases the heat transfer coefficient between the aforesaid incoming and outgoing fluids, in accordance with well-known chemical engineering principles. From the inner casing member 146, the outgoing fluid flows, via, the cold trap fitting 164 and a conduit 179 to the inlet port 40 (Fig. 1) of the motor-pump unit 18.

As noted heretofore, in connection with Fig. 1, in order to ensure that the fluid within the cold trap vessel 141 is maintained at the coldest temperature within the sealed system, comprising the cold trap 109 and the internal cooling passages provided within the motor pump unit 18 and described heretofore in connection with Fig. 1, a cooling jacket or the like is provided adjacent the bottom of the cold trap vessel 141. The cooling jacket is similar to that described heretofore in connection with Fig. 1 and comprises tubing 180 wrapped about the lower portion of the cold trap vessel 141 and connected respectively via the conduits 182 and 184 to the outlet fitting 126 of the motor-pump cooling jacket 30 and to the external coolant outlet 136.

From the foregoing, it will be apparent that a novel and efficient regenerative cold trap has been provided. Although the same has been described in conjunction with the internal cooling system of a motor-pump unit, obviously the cold trap can be utilized in any sealed system wherein it is desired to maintain a portion of that system at a lower temperature in order to effect thereby the removal of impurities by precipitation or congelation therefrom. Therefore, numerous changes in the foregoing exemplary forms of the invention will occur to those skilled in the art without departing from the scope of the invention. Moreover, it is to be understood, that certain features of the invention can be utilized without a corresponding use of other features.

We claim as our invention:

1. A regenerative cold trap comprising a vessel, a partition supported within said vessel and dividing a portion of the interior of said vessel into discrete areas, a mesh member detachably secured to said partition and disposed between said areas, an external casing member communicating with one of said vessel areas, an inner casing member supported within said external casing member and communicating with the other of said vessel areas, said vessel being relatively larger in diameter than said external casing, a cooling jacket surrounding at least a portion of said external casing member, conduits for conducting cooling fluid into and out of said cooling jacket, means for coupling said casing members to an external fluid system, and means for circulating fluid through said external casing to said vessel in heat transfer relation to said cooling jacket and from said vessel through said inner member in heat transfer relation to said external member.

2. In a regenerative cold trap, the combination comprising a vessel, a partition supported within said vessel and dividing a portion of the interior of said vessel into discrete areas, an external casing member communicating with one of said vessel areas, an inner casing member supported within said external casing member and communicating with the other of said vessel areas, said vessel being relatively larger in diameter than said external casing, cooling means provided in association with said external casing, means for coupling said casing members to an external fluid system, and means for circulating fluid through said external casing to said vessel in heat transfer relation to said cooling means and from said vessel through said inner member in heat transfer relation to said external member.

3. A regenerative cold trap comprising a vessel, a partition supported within said vessel and dividing a portion of the interior of said vessel into discrete areas, an external casing member communicating with one of said vessel areas, a cooling jacket surrounding at least a portion of said external casing member, an internal casing member supported within said external casing member and communicating with the other of said vessel areas, said vessel being relatively larger in diameter than said external casing, means for coupling said casing members to an external fluid system, and means for circulating fluid through said external casing to said vessel in heat transfer relation to said cooling jacket and from said vessel through said inner member in heat transfer relation to said external member.

4. A regenerative cold trap comprising a vessel, a partition supported within said vessel and dividing a portion of the interior of said vessel into discrete areas, a mesh member secured to said partition and disposed between said areas, a cooling means, an external casing member communicating with said cooling means and with one of said vessel areas, an inner casing member communicating with the other of said vessel areas, said vessel being relatively larger in diameter than said external casing, a baffle member extending longitudinally of said inner casing member and occupying a substantial proportion of the cross-sectional area of the space enclosed by said casing, means for coupling said casing members to an external fluid system, and means for circulating fluid through said external casing to said vessel in heat transfer relation to said cooling means and from said vessel through said inner member in heat transfer relation to said external member.

5. In a regenerative cold trap, the combination comprising a vessel, a partition supported within said vessel and dividing a portion of the interior of said vessel into discrete areas, a mesh member secured to said partition and disposed between said areas, an external casing member communicating with one of said vessel areas, an inner casing disposed within said external casing and communicating with the other of said vessel areas, said vessel being relatively larger in diameter than said external casing, cooling means associated with said exterior casing, cooling means disposed on said vessel, means for coupling said casing members to an external fluid system, and means for circulating fluid through said external casing to said vessel in heat transfer relation to said cooling means and from said vessel through said inner member in heat transfer relation to said external member.

6. In a regenerative cold trap, the combination comprising a vessel, a partition supported within said vessel and dividing a portion of the interior of said vessel into discrete areas, a mesh member secured to said partition and disposed between said areas, an external casing member secured to said vessel and communicating with one of said vessel areas, an inner casing member supported within said external casing member and communicating with the other of said vessel areas, a cooling jacket provided substantially along the length of said external casing, a second cooling jacket provided adjacent a portion of the surface of said vessel, means for coupling said first and second cooling jackets to a source of fluid coolant, and means for coupling said external and internal casing members to an external fluid system.

7. In a regenerative cold trap, the combination comprising a vessel, a partition supported within said vessel and dividing a portion of the interior of said vessel into discrete areas, a mesh member secured to said partition and disposed between said areas, an external casing communicating with one of said vessel areas, an inner casing supported within said external casing and communicating with the other of said vessel areas, a baffle member positioned within said internal casing member and extending longitudinally thereof, cooling means associated with said external casing, cooling means associated with said vessel, and means for coupling said casings to an external fluid system.

8. In a regenerative cold trap, the combination comprising a vessel, a partition supported within said vessel and dividing a portion of the interior of said vessel into discrete areas, a mesh member secured to said partition and disposed between said areas, an external casing communicating with one of said vessel areas, an inner casing supported within said external casing and communicating with the other of said vessel areas, a tubular baffle member positioned within said inner casing member and extending coaxially therewith, said baffle member being tapered at each end thereof, cooling means associated with said exterior casing, cooling means disposed in heat transferring relationship with a wall portion of said vessel, and means for coupling said casing members to an external fluid system.

9. A regenerative cold trap comprising a vessel; an external casing member secured to said vessel and communicating therewith; an inner casing member supported within said external casing and terminating in a hollow frustoconical partition positioned within said vessel, said inner casing member communicating with said vessel through said partition; a cylindrical mesh member inserted into the open end of said partition and separating that portion of said vessel communicating with said external casing member from that portion of said vessel communicating with said inner casing member; cooling means associated with said external casing member; a second cooling means disposed in heat-conductive relationship with a wall portion of said vessel adjacent said mesh member; and means for coupling said casing members to an external fluid system.

10. A regenerative cold trap comprising a vessel; an external casing member secured to said vessel and communicating therewith; an inner casing member supported within said external casing and terminating in a hollow frustoconical partition positioned within said vessel, said inner casing member communicating with said vessel through said partition, a mesh member inserted into the open end of said partition and separating that portion of said vessel communicating with said external casing member from that portion of said vessel communicating with said inner casing member; cooling means for cooling fluid passing through said external casing member and for cooling fluid in said vessel adjacent said mesh member; and means for coupling said casing members to an external fluid system arranged to circulate fluid through said casing members and said vessel.

11. In a cooling system for an electric motor or the like having a housing and flow passages provided within said housing for circulation of an internal coolant; the combination comprising a cooling jacket secured to said housing; a regenerative cold trap including a vessel, a partition supported within said vessel and dividing a portion of the interior of said vessel into discrete areas, a mesh member secured to said partition and disposed between said areas, an outer casing member secured to said vessel and communicating with one of said vessel areas, an inner casing member positioned within said outer casing member and communicating with the other of said vessel areas, and cooling means associated with said outer casing member; a conduit coupling said cooling means to said motor housing jacket; a conduit connecting said inner casing member to an inlet port of said flow passages; and a conduit connecting an outlet port of said flow passages to said external casing member.

12. In a cooling system for an electric motor or the like having a housing and flow passages provided within said housing for an internal coolant; the combination comprising a cooling jacket secured to said housing; a regenerative cold trap including a vessel, a partition supported within said vessel and dividing a portion of the interior of said vessel into discrete areas, a mesh member secured to said partition and disposed between said areas, an outer casing member secured to said vessel and communicating with one of said vessel areas, an inner casing member positioned within said outer casing member and communicating with the other of said vessel areas, and a cooling jacket provided substantially along the length of said outer casing member; a conduit coupling said cold trap jacket to said motor housing jacket; a conduit connecting said inner casing member to an inlet port of said flow passages; a conduit connecting the outlet port of said flow passages to said external casing member; and a cooling jacket provided adjacent the bottom portion of said vessel and coupled to said motor casing jacket.

13. In a cooling system for an electric motor or the like having a housing and flow passages provided within said housing for circulation of an internal coolant; the combination comprising a cooling jacket secured to said housing; a regenerative cold trap including a vessel, a partition supported within said vessel and dividing a portion of the interior of said vessel into discrete areas, a mesh member secured to said partition and disposed between said areas, an outer casing member secured to said vessel and communicating with one of said vessel areas, and an inner casing member positioned within said outer casing member and communicating with the other of said vessel areas; a pair of tubes in heat exchanging relationship wrapped around said motor housing and being supported thereby; a conduit coupling one of said tubes to said motor cooling jacket; a conduit coupling another of said tubes to one of said casing members and to said vessel; a conduit connecting said inner casing member to an inlet port of said flow passages; and a conduit connecting an outlet port of said flow passages to said external casing member.

14. In a cooling system for an electric motor or the like having a housing and flow passages provided within said housing for circulation of an internal coolant; the combination comprising a cooling jacket secured to said housing; a regenerative cold trap including a vessel, a partition supported within said vessel and dividing a portion of the interior of said vessel into discrete areas, a mesh member secured to said partition and disposed between said areas, an outer casing member secured to said vessel and communicating with one of said vessel areas, and an inner casing member positioned within said outer casing member and communicating with the other of said vessel areas; a pair of tubes in heat exchanging relationship wrapped around said motor housing and being supported thereby; a conduit coupling one of said tubes to said motor cooling jacket; a conduit coupling another of said tubes to one of said casing members and to said vessel; a conduit connecting said inner casing member to an inlet port of said flow passages; a conduit connecting an outlet port of said flow passages to said external casing member; and a cooling jacket provided adjacent the bottom portion of said vessel and coupled to said motor casing jacket.

15. A regenerative cold trap comprising a vessel; an inlet passage communicating with said vessel; an outlet passage communicating with said vessel, said vessel being relatively larger than said outlet and said inlet passages so that fluid is retained in said vessel for a substantial time, said outlet passage being in heat exchanging relationship with said inlet passage; cooling means associated with said inlet passage; and means for coupling said inlet and outlet passages to an external fluid system.

16. In a cooling system for an electric motor, or the like, having a housing and flow passages provided within said housing for circulation of an internal coolant, the combination comprising a cooling jacket secured to said housing; a regenerative cold trap including a vessel, an inlet conduit communicating with said vessel, an outlet conduit communicating with said vessel, said outlet conduit being in heat exchanging relationship with said inlet conduit, and cooling means associated with said inlet conduit; a channel coupling said cooling means to said motor housing jacket; a channel connecting said outlet conduit to an inlet port of said flow passages; and a channel connecting an outlet port of said flow passages to said inlet conduit.

References Cited in the file of this patent

UNITED STATES PATENTS

| | | |
|---|---|---|
| 617,849 | Boes | Jan. 17, 1899 |
| 1,856,771 | Loeffler | May 3, 1932 |
| 1,981,089 | Carpenter | Nov. 20, 1934 |
| 2,135,235 | Hurford et al. | Nov. 1, 1938 |
| 2,556,435 | Moehrl et al. | June 12, 1951 |

FOREIGN PATENTS

| | | |
|---|---|---|
| 500,389 | Great Britain | Feb. 8, 1939 |